United States Patent
Martin et al.

(10) Patent No.: US 10,272,912 B2
(45) Date of Patent: Apr. 30, 2019

(54) METHOD AND SYSTEM FOR CONTROLLING A VEHICLE

(71) Applicant: Ford Global Technologies, LLC, Dearborn, MI (US)

(72) Inventors: Douglas Raymond Martin, Canton, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 520 days.

(21) Appl. No.: 15/066,757

(22) Filed: Mar. 10, 2016

(65) Prior Publication Data
US 2017/0259826 A1  Sep. 14, 2017

(51) Int. Cl.
| | |
|---|---|
| *B60W 10/08* | (2006.01) |
| *B60W 30/18* | (2012.01) |
| *B60W 10/02* | (2006.01) |
| *B60W 10/06* | (2006.01) |
| *B60W 10/10* | (2012.01) |
| *B60W 10/184* | (2012.01) |
| *B60W 50/029* | (2012.01) |
| *B60W 20/00* | (2016.01) |
| *F02D 11/10* | (2006.01) |
| *F02D 29/02* | (2006.01) |
| *F02D 41/00* | (2006.01) |
| *F02D 13/02* | (2006.01) |

(52) U.S. Cl.
CPC .... *B60W 30/18109* (2013.01); *B60W 10/026* (2013.01); *B60W 10/06* (2013.01); *B60W 10/08* (2013.01); *B60W 10/10* (2013.01); *B60W 10/184* (2013.01); *B60W 20/00* (2013.01); *B60W 50/029* (2013.01); *F02D 11/107* (2013.01); *F02D 29/02* (2013.01); *B60W 2510/184* (2013.01); *B60W 2520/10* (2013.01); *B60W 2540/10* (2013.01); *B60W 2540/103* (2013.01); *B60W 2540/106* (2013.01); *B60W 2540/12* (2013.01); *B60W 2550/142* (2013.01); *B60W 2710/024* (2013.01); *B60W 2710/0605* (2013.01); *B60W 2710/1005* (2013.01); *F02D 13/0261* (2013.01); *F02D 41/0002* (2013.01); *F02D 2200/501* (2013.01); *F02D 2200/602* (2013.01); *F02D 2250/26* (2013.01); *Y02T 10/6286* (2013.01)

(58) Field of Classification Search
None
See application file for complete search history.

(56) References Cited

U.S. PATENT DOCUMENTS

| | | | |
|---|---|---|---|
| 7,957,875 B2 * | 6/2011 | Antanaitis | B60T 8/172 188/1.11 R |
| 8,326,509 B2 | 12/2012 | Logan et al. | |
| 8,798,846 B2 * | 8/2014 | Takahashi | B60L 3/0076 701/29.2 |

(Continued)

*Primary Examiner* — Justin Holmes
(74) *Attorney, Agent, or Firm* — Julia Voutyras; McCoy Russell LLP

(57) ABSTRACT

A method for improving operating a vehicle that includes an accelerator pedal is disclosed. In one example, the method assesses a vehicle for accelerator pedal degradation and applies control actions to the vehicle is accelerator pedal degradation is determined. The control actions may include adjusting a throttle position and adjusting vehicle brakes.

19 Claims, 5 Drawing Sheets

(56) References Cited

U.S. PATENT DOCUMENTS

| | | | |
|---|---|---|---|
| 2010/0017088 A1* | 1/2010 | Joyce | B60T 8/172 |
| | | | 701/73 |
| 2010/0235065 A1* | 9/2010 | Logan | B60T 13/662 |
| | | | 701/80 |
| 2011/0264354 A1 | 10/2011 | Debs et al. | |

* cited by examiner

METHOD AND SYSTEM FOR CONTROLLING A VEHICLE

FIELD

The present description relates to a system for improving vehicle operation. The method may be particularly useful for vehicles that allow simultaneous brake and accelerator pedal operation.

BACKGROUND AND SUMMARY

A vehicle may be equipped with an accelerator pedal for translating a driver torque request into a powertrain torque request. The powertrain torque request may be provided via an engine or an engine cooperating with a motor to propel the vehicle. By applying or depressing the accelerator pedal, a driver may request additional torque from the vehicle. Vehicle torque may be reduced via releasing or partially releasing the accelerator pedal, thereby allowing the accelerator pedal to return to an initial or base position.

An accelerator pedal or accelerator pedal sensor may degrade over a vehicle's life cycle. The accelerator pedal and/or accelerator pedal sensor may output a signal having a value higher or lower than is expected when the accelerator pedal or accelerator pedal sensor is degraded. Alternatively, or in addition, the accelerator pedal may not travel as freely as is desired during some conditions. Consequently, it may be possible for the accelerator pedal and/or accelerator pedal sensor output to be a substantially constant value representing an accelerator pedal position other than base accelerator pedal position during a condition where it is expected that the accelerator pedal is in its base position. Whether or not the accelerator pedal and/or accelerator pedal position sensor is degraded, it may be desirable to be able to stop the vehicle during conditions of accelerator pedal degradation while a driver is applying vehicle brakes.

If a driver applies vehicle brakes during periods of accelerator pedal degradation, brake performance may be reduced over time. Further, vehicle braking system components may degrade during such conditions. Therefore, it may be desirable to provide sufficient braking power to stop a vehicle when an accelerator pedal demand is requested without significantly increasing braking system degradation.

The inventors herein have recognized the above-mentioned disadvantages and have developed a method for operating a vehicle, comprising: reducing powertrain torque in response to a speed of a vehicle being greater than a speed at which vehicle brakes have capacity to fully stop the vehicle at a present temperature of vehicle brakes.

By reducing powertrain torque in response to speed of a vehicle being greater than a speed at which vehicle brakes have capacity to fully stop the vehicle at a present temperature of vehicle brakes, it may be possible to provide a desired level of vehicle braking without causing significant brake component degradation. Further, in some examples, a transmission of the vehicle may be shifted from a forward gear into neutral so as to further reduce an amount of braking force to stop a moving vehicle. In these ways, powertrain power may be reduced to lower the possibility of brake system component degradation while providing braking power sufficient to stop the vehicle.

The present description may provide several advantages. In particular, the approach may reduce the possibility of brake system component degradation. Additionally, the approach may provide a desired amount of braking power to stop a vehicle during conditions of accelerator pedal and/or accelerator pedal sensor degradation. Further, the approach compensates for driving conditions in an effort to provide more consistent vehicle braking during conditions of accelerator pedal and/or accelerator pedal sensor degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
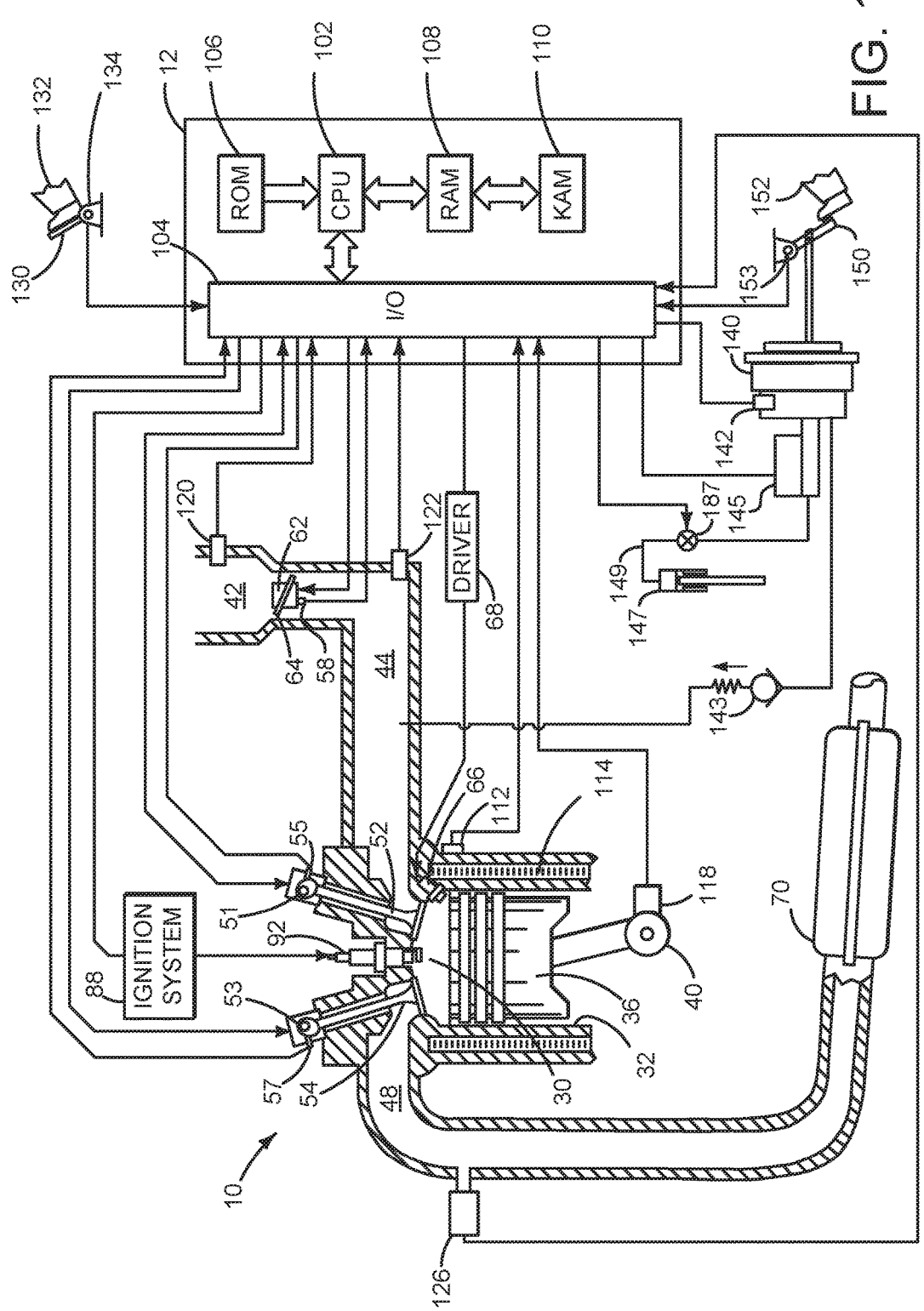
FIG. 1 is a schematic diagram of an engine.
Figure 2:
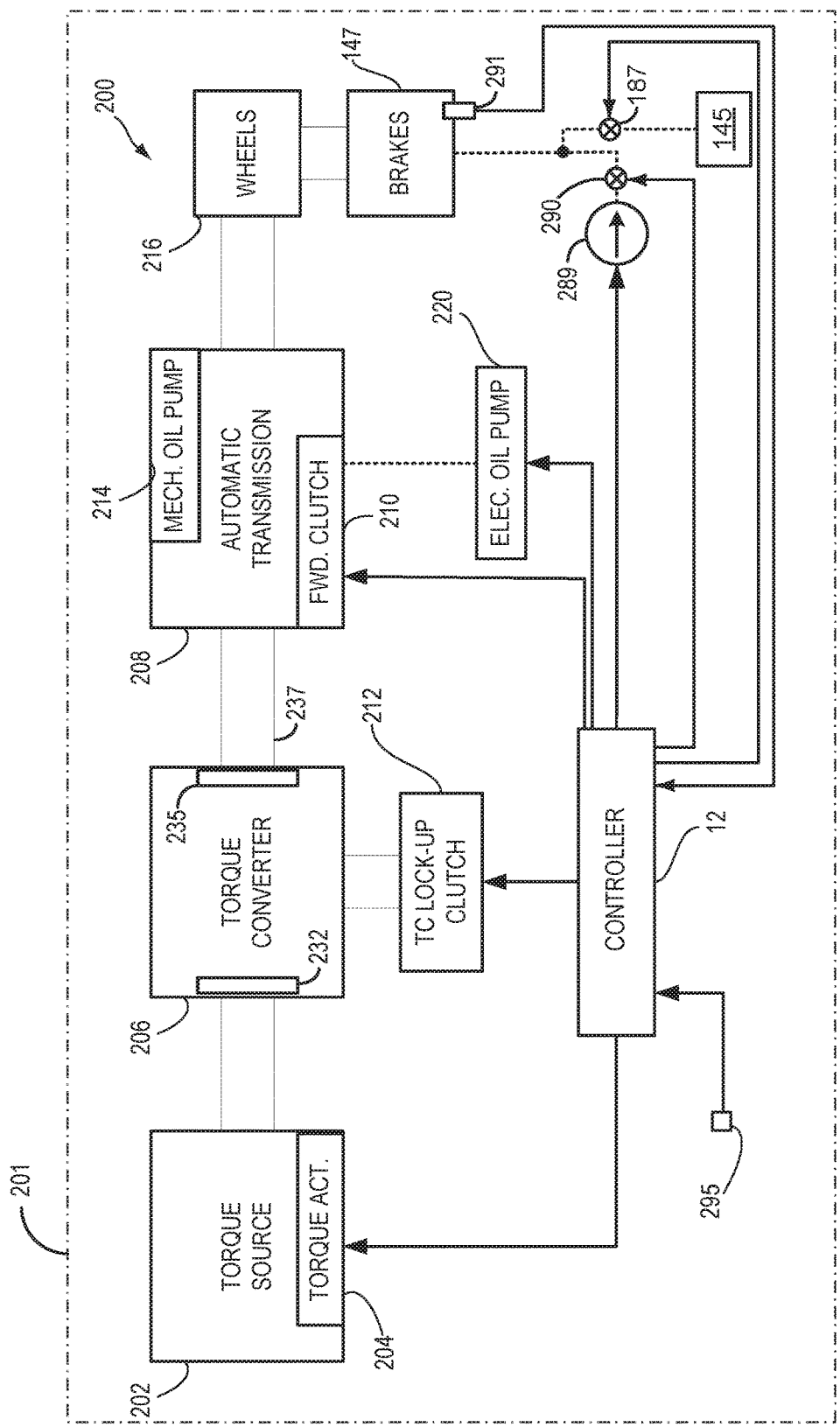
FIG. 2 shows an example vehicle system layout.

The present description is related to controlling operation of a vehicle. In one non-limiting example, the vehicle may include an engine as illustrated in FIG. 1. Further, the engine may be part of a vehicle as illustrated in FIG. 2. The vehicle may operate according to the sequence shown in FIG. 3 according to the method of FIG. 4. Torque provided to vehicle wheels may be controlled responsive to the curve or relationship shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of signal from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle brakes 147 may be supplied pressurized fluid in brake line 149 from master cylinder 145. Brake booster 140 assists operator foot 152 applying brake pedal 150 to operate brakes 147. Vacuum in brake booster 140 may be sensed via vacuum sensor 142. Check valve 143 allows air to flow from brake booster 140 to intake manifold 44. Check valve 143 limits air flow from intake manifold 44 to brake booster 140. Intake manifold 44 may supply vacuum to vacuum brake booster 140. Brake pedal position sensor 153 provides brake pedal position to controller 12. Valve 187 selectively allows brake fluid from master cylinder 145 to vehicle brakes 147. Brake temperature sensor 291 provides brake temperature information to controller 12. Alternatively, brake temperature may be estimated via a model.

Controller 12 is shown in FIG. 1 as a conventional microcomputer including: microprocessor unit 102, input/output ports 104, non-transitory (e.g., read-only memory) 106, random access memory 108, keep alive memory 110, and a conventional data bus. Controller 12 is shown receiving various signals from sensors coupled to engine 10, in addition to those signals previously discussed, including: engine coolant temperature from temperature sensor 112 coupled to cooling sleeve 114; a position sensor 134 coupled to an accelerator pedal 130 for sensing travel or angle applied by foot 132; a measurement of engine manifold pressure 58 from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows a vehicle as dash-dot line 201 and a block diagram of a vehicle drivetrain or powertrain 200. Drivetrain 200 may be powered by a torque source 202. In some examples, torque source 202 may be a motor instead of an engine, or a combination of a motor and an engine. Motor torque may be adjusted responsive to driver demand torque and/or accelerator pedal 130. If torque source 202 is an engine 10 as shown in FIG. 1, it may be started with an engine starting system (not shown). Further, torque of torque source 202 may be adjusted via torque actuator 204, such as a fuel injector, throttle, camshaft, inverter, power electronics, etc.

A torque source output torque may be transmitted to torque converter 206 to drive an automatic transmission 208. Torque converter 206 includes impeller 232 and turbine 235. Further, one or more clutches may be engaged, including forward clutch 210, to propel a vehicle. In one example, the torque converter may be referred to as a component of the transmission. Further, transmission 208 may include a plurality of gear clutches that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle. Specifically, automatic transmission 208 may transfer an input driving torque at the input shaft 237 responsive to a vehicle traveling condition before transmitting an output driving torque to the wheels.

Further, a frictional force may be applied to wheels 216 by engaging wheel brakes 147. In one example, wheel brakes 147 may be engaged in response to the driver pressing his foot on a brake pedal 150 shown in FIG. 1. In the same way, a frictional force may be reduced to wheels 216 by disengaging wheel brakes 147 in response to the driver releasing his foot from a brake pedal.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of torque source 202 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from torque source 202. In examples where torque source is an engine as shown in FIG. 1, controller may be in communication with torque device 202 as is shown in more detail in FIG. 1. Accordingly, controller 12 may control a torque output of the torque source 202 and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. Controller 12 may determine road grade from inclinometer 295 or from a map. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Further, controller 12 may receive an estimate of road grade from inclinometer 295.

A wheel brake pressure may also be adjusted during the engine shutdown or when braking is requested and a driver is not applying the vehicle brake pedal. The wheel brake pressure may be further adjusted based on road grade, engine speed, a driveline torque, or time since engine start. In addition, valve 290 may be closed when a driver is applying vehicle brakes. Valve 187 may be closed when a controller is adjusting vehicle brake pressure to isolate brake pressure from master cylinder 145. In one example, fluid pressure supplied to brakes 147 is adjusted via varying output of pump 289. In this example, a typically brake system may be designed to increase the brake fluid pressure via a closed hydraulic system that utilizes a pump to increase the pressure and valves to decrease or dump the pressure. Fluid reservoir sources and the appropriate valves and hydraulic plumbing are known to those skilled in the art and are not depicted in FIG. 2. Hydraulic brake lines are shown as dashed lines.

Figure 3:
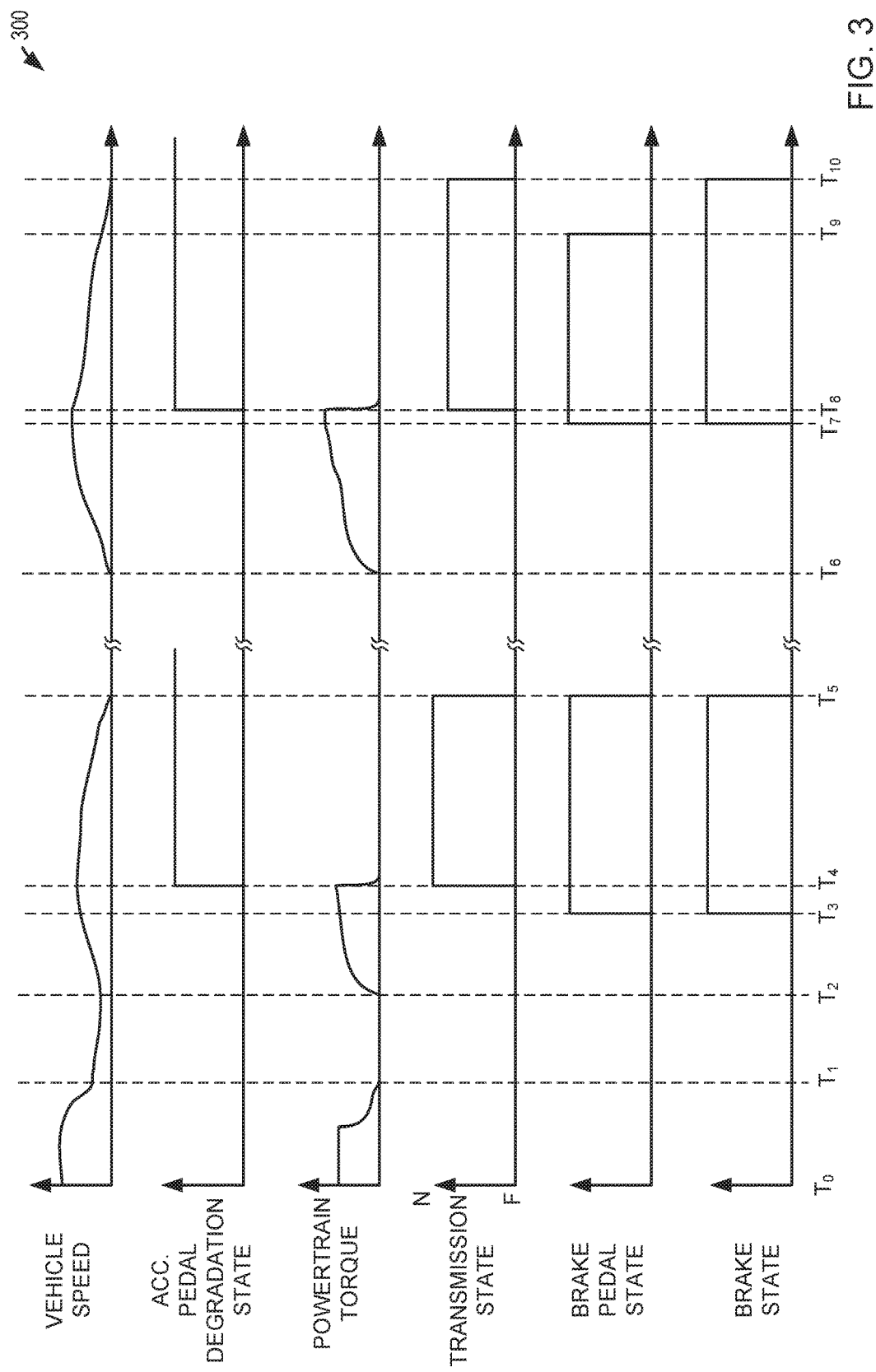
FIG. 3 shows an example operating sequence for a vehicle.
Figure 4:
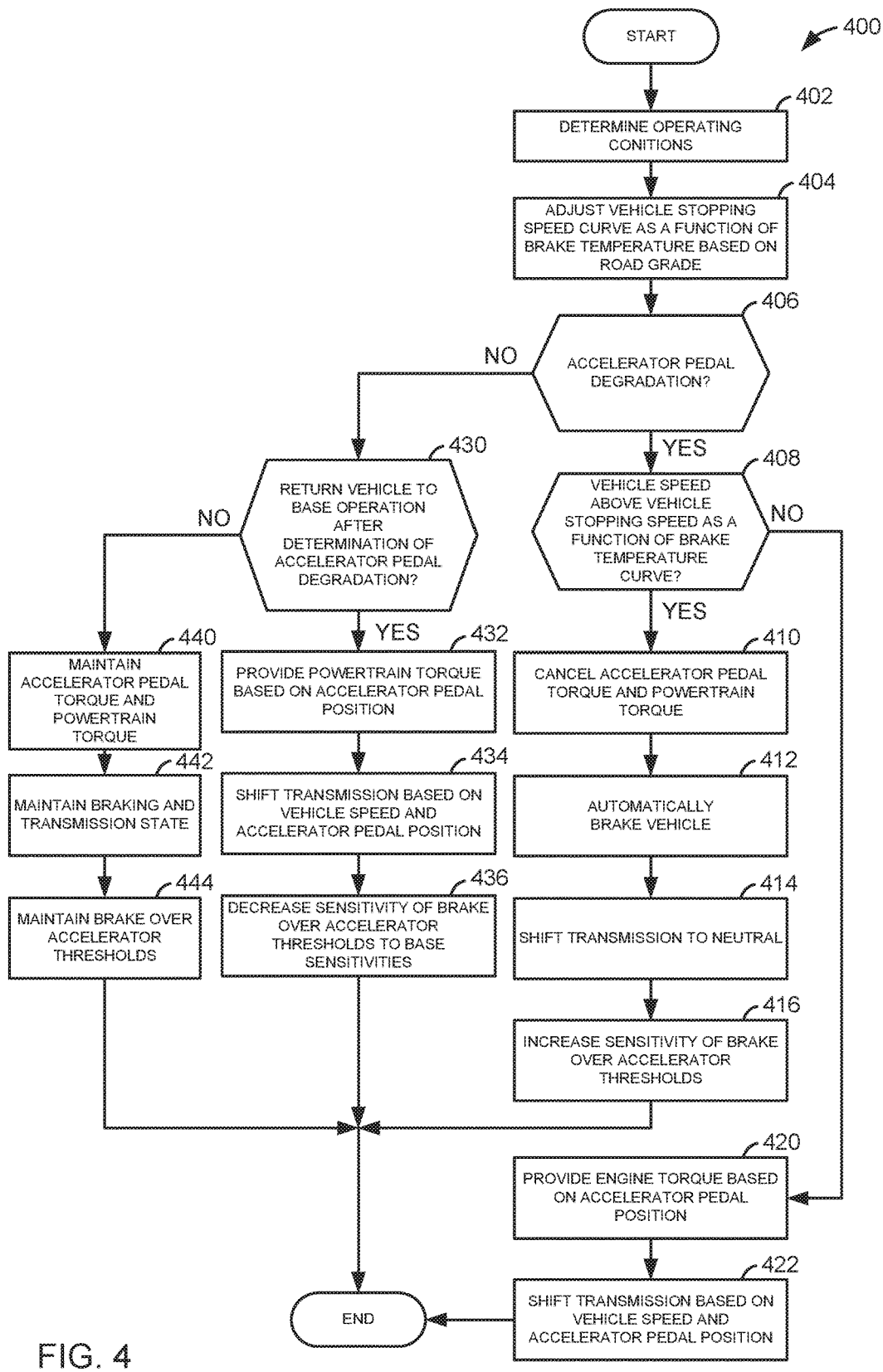
FIG. 4 is a flowchart of an example method for controlling a vehicle.

Referring to FIG. 3, an example plot of a simulated vehicle operating sequence according to the method of FIG. 4 is shown. The plots of FIG. 3 are time aligned and occur at a same timing. The double SS marks along the horizontal axes of each plot indicate a brake in time that may be long or short in duration.

The first plot from the top of FIG. 3 represents vehicle speed versus time. The horizontal axis represents time and time increases from the left hand side of the plot to the right hand side of the plot. The vertical axis represents vehicle speed and vehicle speed increases in the direction of the vertical axis arrow.

The second plot from the top of FIG. 3 represents accelerator pedal and/or accelerator pedal sensor degradation state versus time. The horizontal axis represents time and time increases from the left hand side of the plot to the right hand side of the plot. The vertical axis represents the presence or absence of accelerator pedal degradation. Accelerator pedal degradation is determined to be present when the trace is at a higher level near the vertical axis arrow. Accelerator pedal and/or sensor degradation is determined not to be present when the trace is at a lower level near the horizontal axis.

The third plot from the top of FIG. 3 represents powertrain torque versus time. The horizontal axis represents time and time increases from the left hand side of the plot to the right hand side of the plot. The vertical axis represents powertrain torque and powertrain torque increases in the direction of the vertical axis arrow. The powertrain torque may be a torque at an input shaft of a transmission or at vehicle wheels.

The fourth plot from the top of FIG. 3 represents transmission operating state versus time. The horizontal axis represents time and time increases from the left hand side of the plot to the right hand side of the plot. The vertical axis represents transmission operating states. The transmission operates in neutral where torque is not transferred from an input shaft of the transmission to an output shaft of the transmission when the trace is at a higher level near the vertical axis arrow. The transmission operates in a forward gear where torque is transferred from an input shaft of the transmission to an output shaft of the transmission when the trace is at a lower level near the horizontal axis.

The fifth plot from the top of FIG. 3 represents brake pedal operating state versus time. The horizontal axis represents time and time increases from the left hand side of the plot to the right hand side of the plot. The vertical axis represents brake pedal operating state. The brake pedal is applied by the vehicle driver when the brake pedal operating state trace is at a higher level near the vertical axis arrow. The brake pedal is not applied by the vehicle driver when the brake pedal operating state trace is at a lower level near the horizontal axis.

The sixth plot from the top of FIG. 3 represents vehicle brake operating state versus time. The horizontal axis represents time and time increases from the left hand side of the plot to the right hand side of the plot. The vertical axis represents vehicle brake operating state. The vehicle brakes are applied when the brake operating state trace is at a higher level near the vertical axis arrow. The vehicle brakes are not applied when the brake pedal operating state trace is at a lower level near the horizontal axis.

The vehicle brake state may or may not follow the brake pedal state. If the vehicle brakes are applied by a controller, the vehicle brakes may be applied without the driver applying the brake pedal.

At time $T_0$, the vehicle is moving and the accelerator pedal is not in a degraded state. The powertrain torque is also at an elevated level and the transmission is operating in a forward gear. The brake pedal is not applied and the brake state indicates that vehicle brakes are not applied.

At time $T_1$, the powertrain torque is reduced to zero and the vehicle speed is decreasing. The accelerator pedal degradation state indicates that the accelerator pedal and/or accelerator pedal position sensor is not degraded. The transmission is in a forward gear and the brake pedal state indicates that the brake pedal is not applied. Further, the brake state indicates that vehicle brakes are not applied.

At time $T_2$, the powertrain torque increases in response to the accelerator pedal being applied (not shown). The vehicle speed begins to increase and accelerator pedal degradation state is not asserted. The transmission is in a forward gear and the vehicle brakes and brake pedal are not applied.

At time $T_3$, the vehicle brake pedal is applied and the vehicle brakes are applied in response to the vehicle brake pedal being applied. The powertrain torque is at a middle level and the vehicle speed is increasing. The accelerator pedal degradation state is not asserted and the transmission is operating in a forward gear.

At time $T_4$, the accelerator pedal degradation state is asserted to indicate accelerator pedal degradation. In one example, accelerator pedal and/or accelerator pedal sensor degradation may be determined based on vehicle speed, accelerator pedal position, duration the brake pedal is applied, and vehicle braking force as determined via brake line pressure. The powertrain torque is reduced to zero in response to the indication of accelerator pedal degradation. The vehicle speed is decreasing slowly and the transmission is shifted into neutral from a forward gear in response to the indication of accelerator pedal degradation. By shifting into neutral, powertrain torque may be diverted from vehicle wheels so that the vehicle may stop sooner and using less braking force or power. The brake pedal state remains asserted and the vehicle brakes remain applied.

At time $T_5$, the vehicle comes to a stop (e.g., vehicle speed is zero at the horizontal axis) and the accelerator pedal degradation state remains asserted. The powertrain torque is also shown at zero. The transmission is in neutral and the brake pedal is applied. The vehicle brakes are also applied.

Thus, if accelerator pedal or accelerator pedal sensor degradation is present, the vehicle's transmission may be shifted from a forward gear to neutral. The vehicle brakes may follow the brake pedal state such that the vehicle is brought to a stop. The accelerator pedal degradation state may be cleared if the accelerator pedal sensor output is in an expected range and/or if the accelerator pedal may travel as freely as is expected.

At time $T_6$, the accelerator pedal degradation state is not asserted and the powertrain torque begins to increase in response to the accelerator pedal being applied (not shown). The vehicle speed begins to accelerate in response to the increase in powertrain torque. The vehicle's transmission is in a forward gear and the vehicle's brakes are not applied. Additionally, the vehicle brake pedal is not applied.

At time $T_7$, the driver applies the vehicle brakes and the powertrain torque is at a higher level. The vehicle speed is also at a higher level and the accelerator pedal degradation state is not asserted, which indicates accelerator pedal degradation is not present. The transmission is engaged in a forward gear and the brake pedal is applied as indicated by the brake pedal state being at a higher level.

At time $T_8$, the accelerator pedal degradation state is asserted to indicate accelerator pedal degradation. The powertrain torque is reduced to zero in response to accelerator pedal degradation being asserted. The vehicle speed is decreasing slowly and the requested powertrain torque is zero (e.g., at the horizontal axis). The transmission is shifted into neutral from a forward gear in response to the indication of accelerator pedal degradation. The brake pedal state remains asserted and the vehicle brakes remain applied.

At time $T_9$, the driver releases the brake pedal while the accelerator pedal degradation state is asserted. The vehicle speed continues to decrease while the vehicle brakes are applied. Note that the vehicle brake state does not follow the vehicle brake pedal state. Rather, the vehicle brakes remain applied to slow the vehicle, at least until vehicle speed is less than a threshold speed. The vehicle brakes are automatically applied. The transmission also remains in neutral since the accelerator pedal state is indicated as being degraded.

At time $T_{10}$, the vehicle speed is reduced to being within a threshold speed of zero. The accelerator pedal degradation state remains asserted and the powertrain torque remains at a lower level. The transmission state transitions from neutral to a forward gear and the brakes are not applied. Additionally, the brake pedal is not applied. However, in some examples, the vehicle brakes may remain applied.

Thus, vehicle brakes may be automatically applied in response to an indication of accelerator pedal degradation, even if a driver releases the vehicle brake pedal. The vehicle brakes may be automatically released after the vehicle speed is reduced to a threshold speed.

Referring now to FIG. 4, a method for operating a vehicle is described. The method of FIG. 4 may be stored as executable instructions in non-transitory memory of controller 12 described in FIGS. 1 and 2. Further, the method of FIG. 4 may provide the operating sequence illustrated in FIG. 3. Further still, at least portions of the method of FIG. 4 may be actions taken in cooperation with a controller in the physical world to transform vehicle operation.

At 402, method 400 determines operating conditions. Operating conditions may include but are not limited to engine speed, engine load, vehicle speed, driver demand torque, accelerator pedal position, brake pedal position, vehicle speed, road grade, and engine temperature.

Figure 5:
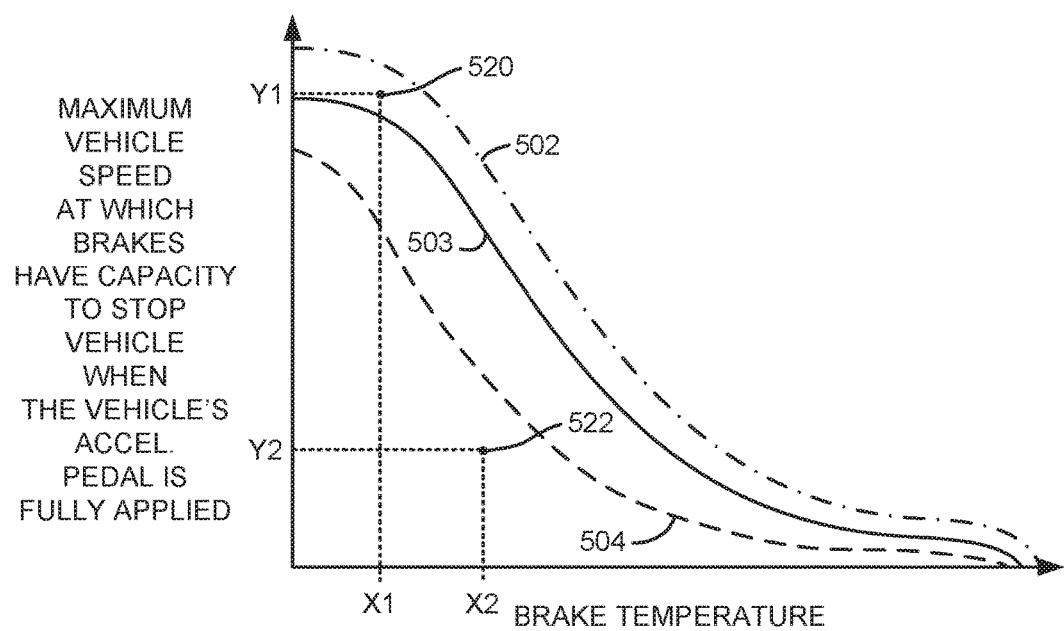
FIG. 5 is a plot of maximum vehicle speeds at which vehicle brakes have capacity to stop the vehicle when the vehicle's accelerator pedal is fully applied.

At 404, method 400 adjusts a vehicle stopping speed curve (e.g., as is shown in FIG. 5) as a function of vehicle brake temperature based on road grade. In one example, the maximum vehicle speed at which vehicle brakes have sufficient stopping power to stop a vehicle when the accelerator pedal is fully applied increases as a positive grade (e.g., uphill) of a road increases (e.g., as road grade increases from 1% to 2%). Similarly, a magnitude of the maximum vehicle speed at which vehicle brakes have sufficient stopping power to stop a vehicle when the accelerator pedal is fully applied decreases as a negative grade (e.g., downhill) of a road increases (e.g., as road grade magnitude increases from −1% to −2%). In one example, road grade is used to index a table or function that outputs a multiplier value that multiplies a base curve (e.g., 503 of FIG. 5, which is for a curve representing a flat road) representing a maximum vehicle speed at which vehicle brakes have sufficient stopping power to stop a vehicle when the accelerator pedal is fully applied. The result is a curve modified for road grade, such as curves 502 and 504 of FIG. 5. Method 400 proceeds to 406 after the curve of maximum vehicle speed at which vehicle brakes have sufficient stopping power to stop a vehicle when the accelerator pedal is fully applied is adjusted for road grade.

At 406, method 400 judges if accelerator pedal degradation is present. In one example, accelerator pedal and/or accelerator pedal sensor degradation may be determined based on vehicle speed, accelerator pedal position, duration the brake pedal is applied, and vehicle braking force as determined via brake line pressure. For example, if vehicle speed is greater than a threshold, the vehicle brake has been applied for longer than a threshold duration, and brake pedal force is greater than a threshold, it may be determined that accelerator pedal degradation is present. If method 400 judges that accelerator pedal degradation is present, the answer is yes and method 400 proceeds to 408. Otherwise, the answer is no and method 400 proceeds to 430.

In addition, method 400 may use other conditions, in addition to or in conjunction with the above mentioned conditions to determine if brake pedal or brake pedal sensor degradation is present. For example, if accelerator pedal position is not a base or fully release position and accelerator pedal position is constant for longer than a predetermined amount of time, accelerator pedal degradation may be determined. During such conditions, the accelerator pedal may not be moving as freely as is desired or the accelerator pedal sensor may not be responding as is desired to accelerator pedal movement.

At 408, method 400 judges if vehicle speed is greater than a maximum vehicle speed at which vehicle brakes have sufficient capacity or power to stop the vehicle when the accelerator pedal is fully applied at the present brake temperature. Method 400 judges if vehicle speed is greater than the maximum vehicle speed curve (e.g., 503 of FIG. 5) at a present brake temperature. For example, if the vehicle is traveling at 60 KPH and the maximum vehicle speed at which vehicle brakes have sufficient capacity or power to stop the vehicle when the accelerator is fully applied is 40 KPH, the answer is no and method 400 proceeds to 420. The brake capacity or power may be expressed as a force (e.g., Newtons) or a torque (N-m). However, if the vehicle is traveling at 40 KPH and the maximum vehicle speed at which vehicle brakes have sufficient capacity or power to stop the vehicle when the accelerator is fully applied is 60 KPH, the answer is yes and method 400 proceeds to 410.

At 420, method 400 commands the engine to provide torque based on accelerator pedal position and vehicle speed. In one example, accelerator pedal position and vehicle speed are used to index a table that outputs a desired powertrain torque. The engine is commanded to the desired powertrain torque. The engine may be commanded to the desired powertrain torque via adjusting spark timing, fuel injection timing, and throttle position. Method 400 proceeds to 422 after engine torque is commanded.

At 422, method 400 shifts the transmission based on vehicle speed and accelerator pedal position. In one example, method 400 shifts the transmission gears according to a predetermined shift schedule based on accelerator pedal position and vehicle speed. The transmission may be shifted via applying clutches within the transmission. Method 400 proceeds to exit after the transmission is shifted.

At 410, method 400 reduces or cancels accelerator pedal torque and desired powertrain torque. By reducing or canceling accelerator pedal torque and desired powertrain torque, the vehicle may be stopped with less braking force. In one example, the accelerator pedal torque may be cancelled via adjusting the accelerator pedal torque to zero. Likewise, the desired powertrain torque may be cancelled via adjusting the powertrain torque to zero.

The accelerator pedal torque is a torque requested by the driver via the accelerator pedal. The accelerator pedal position and vehicle speed are used to index a transfer function that outputs an accelerator pedal torque. The accelerator pedal torque may be converted to a powertrain torque. The powertrain torque may be comprised of an engine torque request and a motor torque request. The engine torque request plus the motor torque request may equal the powertrain torque request. If the motor is not operating or not present, the engine torque may be equal to the powertrain torque.

Alternatively, the accelerator pedal torque and/or the power train torque may be reduced to predetermined torque amounts that are non-zero. For example, the powertrain torque may be a torque sufficient to propel the vehicle at 10 KPH in first gear. In this way, the powertrain torque may be sufficient for the vehicle to move to a side of a road. Method 400 proceeds to 412 after reducing or cancelling the accelerator pedal and/or powertrain torque.

At 412, method 400 automatically applies vehicle brakes. The vehicle brakes may be automatically applied or increased via a controller commanding brake line pressure to increase via increasing output of a pump. In one example, vehicle braking force is increased to a predetermined level. Method 400 proceeds to 414 after automatically applying vehicle brakes.

At 414, method 400 shifts the transmission from a forward gear into neutral so that torque applied to the transmission input shaft is not transmitted to the transmission output shaft. The transmission may be shifted via adjusting pressures applied to transmission clutches. For example, all transmission clutches may be commanded open to shift the transmission to neutral. Method 400 proceeds to 416 after the transmission is shifted to neutral.

Alternatively, in some examples, method 400 may shift the transmission into neutral only if vehicle speed is greater than a threshold speed. Otherwise, the transmission may be shifted according to a shift schedule based on the accelerator or powertrain torque determined at 410.

At 416, method 400 adjusts sensitivities of brake over accelerator pedal thresholds. Brake over accelerator pedal thresholds are control parameters used when the accelerator pedal sensor is outputting a value not indicative of a fully released accelerator pedal while the vehicle brakes are applied by the vehicle driver.

One brake over accelerator pedal threshold may be a brake pedal applied signal debounce time. In one example, the brake pedal applied signal debounce time may be decreased so that the brake pedal applied signal changes state sooner after the brake pedal position changes when sensitivity of the brake pedal signal is increased.

Other brake over accelerator pedal thresholds may be accelerator pedal degradation thresholds. For example, the duration that the brake pedal is applied for determining accelerator pedal degradation or returning from a condition of accelerator pedal degradation may be reduced to increase the sensitivity of entering or exiting an accelerator pedal degradation state. Method 400 proceeds to exit after adjusting brake over accelerator pedal sensitivity thresholds.

It should be noted that operations described in 410, 412, 414 and 416 are not mutually exclusive, nor are they all required. Each operation described may be used to reduce vehicle speed to below the stopping speed as a function of brake temperature curve described in 408 and may be used exclusively or in any combination with the other operations. In addition, the order or priority which methods 410, 412, 414, and 416 are depicted is not necessarily the optimum order. External conditions, not necessarily described, may be used to determine the best primary, secondary, tertiary, and quaternary method to slow down the vehicle.

At 430, method 400 judges whether or not it may be desirable to return the vehicle to base operation after experiencing accelerator pedal degradation. In one example, method 400 may judge that it is desirable to return the vehicle to base operation after a brake pedal is fully released and the accelerator pedal is fully released to a base position where the accelerator pedal outputs a voltage or current corresponding to the base accelerator pedal position. If method 400 judges that it is desirable to return the vehicle to base operation, the answer is yes and method 400 proceeds to 432. Otherwise, the answer is no and method 400 proceeds to 440. Further, if accelerator pedal degradation has not been previously determined, method 400 proceeds to 432.

At 432, method 400 adjusts powertrain torque based on a position of the accelerator pedal and vehicle speed. In one example, accelerator pedal position and vehicle speed index a table or function that outputs a desired powertrain torque. The powertrain is commanded to the desired powertrain torque. Thus, the engine may be commanded to the desired powertrain torque, a motor may be commanded to the desired powertrain torque, or the engine and the motor may be commanded to the desired powertrain torque. Method 400 proceeds to 434 after commanding the powertrain to the desired powertrain torque.

At 434, method 400 shifts the vehicle's transmission based on vehicle speed and accelerator pedal position. In one example, accelerator pedal position and vehicle speed index a transmission shift schedule and the transmission shift schedule outputs a desired gear. The transmission is shifted to the desired gear by supplying pressurized transmission fluid to selected transmission clutches. Method 400 proceeds to 436 after the transmission is shifted.

At 436, method 400 returns sensitivities of brake over accelerator pedal thresholds to their base values. For example, a brake pedal applied signal debounce time is returned to its base value. As such, the brake pedal applied signal debounce time may be increased so that the brake pedal applied signal changes state later after the brake pedal position changes when sensitivity of the brake pedal signal is decreased. Likewise, accelerator pedal degradation thresholds may be returned to their base values. For example, the duration that the brake pedal is applied for determining accelerator pedal degradation or returning from a condition of accelerator pedal degradation may be increased to decrease the sensitivity of entering or exiting an accelerator pedal degradation state. Method 400 proceeds to exit after adjusting brake over accelerator pedal sensitivity thresholds.

At 440, method 400 maintains accelerator pedal torque and powertrain torque. If the brake pedal has not been released by the driver after a condition of accelerator pedal degradation, it may be desirable to maintain accelerator pedal torque and powertrain torque at the levels determined at 410 so that powertrain torque may not overcome braking force until the driver releases the vehicle brake pedal and expects an increase in vehicle torque. The powertrain is commanded to the maintained powertrain torque demand. Method 400 proceeds to 442 after maintaining accelerator pedal torque and powertrain torque.

At 442, method 400 maintains vehicle braking and transmission state. The vehicle braking and transmission state may be maintained so that the vehicle continues on its deceleration trajectory until the driver releases the vehicle brake pedal or other conditions are present where increased torque delivery to vehicle wheels may be expected. Method 400 proceeds to 444 after maintaining vehicle braking and transmission stated.

At 444, method 400 maintains sensitivities of brake over accelerator pedal thresholds at values determined at 416. Method 400 proceeds to exit after maintaining brake over accelerator pedal sensitivity thresholds.

In this way, the method of FIG. 4 may adjust powertrain torque, accelerator pedal torque, transmission operating state, and control parameters in response to accelerator pedal degradation. The adjusted powertrain torque, accelerator pedal torque, transmission operating state, and control parameters may be returned to based conditions after accelerator pedal degradation has been mitigated.

Thus, the method of FIG. 4 provides for a method for operating a vehicle, comprising: reducing powertrain torque in response to a speed of a vehicle being greater than a speed at which vehicle brakes have capacity or stopping force to fully stop the vehicle when the accelerator pedal is fully applied or applied greater than a threshold amount at a present temperature of vehicle brakes. The method further comprises increasing a force applied to vehicle brakes in response to the speed of the vehicle being greater than the speed at which the vehicle brakes have capacity to stop the vehicle at the present temperature of the vehicle brakes, where the speed at which vehicle brakes have capacity to fully stop the vehicle is based on the present temperature of vehicle brakes, and where the present temperature of vehicle brakes is a temperature of brakes of a vehicle traveling on a road.

In some examples, the method further comprises adjusting the speed at which the vehicle brakes have capacity to fully stop the vehicle when the accelerator pedal is fully applied or applied greater than a threshold amount at the present temperature of the brakes in response to road grade. For example, curve 503 may be adjusted to curve 502 or curve 504. The method includes where the speed at which the vehicle brakes has capacity to stop the vehicle at the present temperature of the brakes increases in response to an increasing positive road grade. The method includes where the speed at which the vehicle brakes has capacity to stop the vehicle at the present temperature of the brakes decreases in response to an increasing negative road grade. The method includes where the powertrain torque is reduced via at least partially closing a throttle. The method further comprises shifting a transmission of the vehicle into neutral in response to the speed of the vehicle being greater than the speed at which vehicle brakes have capacity to stop the vehicle at the present temperature of vehicle brakes.

The method of FIG. 4 also provides for a method for operating a vehicle, comprising: providing a requested powertrain torque in response to a speed of a vehicle being less than a speed at which vehicle brakes have capacity to fully stop the vehicle when the accelerator pedal is fully applied or applied greater than a threshold amount at a present temperature of vehicle brakes; and reducing powertrain torque in response to a speed of a vehicle being greater than a speed at which vehicle brakes have capacity to fully stop the vehicle at a present temperature of vehicle brakes. The method includes where the speed at which vehicle brakes have capacity to fully stop the vehicle at the present temperature of the vehicle brakes is described via a curve. The method further comprises shifting a transmission of the vehicle into neutral in response to the speed of the vehicle being greater than the speed at which vehicle brakes have capacity to stop the vehicle at the present temperature of vehicle brakes.

In some examples, the method further comprises adjusting thresholds for determining accelerator pedal degradation in response to operating the vehicle above the speed at which vehicle brakes have capacity to fully stop the vehicle when the accelerator pedal is fully applied or applied greater than a threshold amount at the present temperature of vehicle brakes. The method further comprises adjusting the speed at which the vehicle brakes have capacity to fully stop the vehicle at the present temperature of the brakes in response to road grade. The method includes where the requested powertrain torque is based on accelerator pedal position. The method further comprises applying vehicle brakes until the vehicle is within a predetermined speed fully stopped when the brake pedal is released in response to a degraded accelerator pedal.

Referring now to FIG. 5, a plot of maximum vehicle speeds at which vehicle brakes have capacity (e.g., stopping force) to stop a vehicle when the vehicle's accelerator pedal is fully applied is shown. The plot has a vertical axis that represents a maximum vehicle speed at which vehicle brakes have capacity to stop a vehicle when the vehicle's accelerator pedal is fully applied. The horizontal axis represents brake temperature.

Curve 503 represents a maximum vehicle speed at which vehicle brakes have capacity to stop a vehicle when the vehicle's accelerator pedal is fully applied versus brake temperature for a vehicle traveling on a level road. Curve 502 represents a maximum vehicle speed at which vehicle brakes have capacity to stop a vehicle when the vehicle's accelerator pedal is fully applied versus brake temperature for a vehicle traveling on a road with a positive grade. Curve 504 represents a maximum vehicle speed at which vehicle brakes have capacity to stop a vehicle when the vehicle's accelerator pedal is fully applied versus brake temperature for a vehicle traveling on a road with a negative grade.

It may be observed that vehicle brakes may stop a vehicle traveling at a higher speed when brake temperature is low. It may also be observed that when vehicle brake temperature is high, vehicle brakes may stop only a vehicle traveling at lower speeds. Thus, if the vehicle is operating at the conditions show at 520 and driving on a level road, the vehicle brakes lack capacity (e.g., stopping force) to stop the vehicle if the vehicle's accelerator pedal is fully applied when brake temperature is at the value X1 because a maximum vehicle speed at which vehicle brakes have capacity to stop a vehicle when the vehicle's accelerator pedal is fully applied is greater than curve 503. A maximum vehicle speed at which vehicle brakes have capacity to stop a vehicle when the vehicle's accelerator pedal is fully applied is shown at Y1. Conversely, if the vehicle is operating at the conditions show at 522 and driving on a level road, the vehicle brakes have capacity (e.g., stopping force) to stop the vehicle if the vehicle's accelerator pedal is fully applied when brake temperature is at the value X2 because a maximum vehicle speed at which vehicle brakes have capacity to stop a vehicle when the vehicle's accelerator pedal is fully applied is less than curve 503. A maximum vehicle speed at which vehicle brakes have capacity to stop a vehicle when the vehicle's accelerator pedal is fully applied is shown at Y2.

It may be desirable to take mitigating actions (e.g., shifting a transmission to neutral and decreasing powertrain torque) if the vehicle is operating on a level road at conditions above curve 503 during conditions of accelerator pedal degradation. On the other hand, no mitigating actions may be taken if the vehicle is operating on the level road at conditions below curve 503 during conditions of accelerator pedal degradation because vehicle brakes have stopping force to stop the vehicle even if the accelerator pedal is fully applied.

Curves 502-504 may be empirically determined and stored to memory. The speed at which vehicle brakes have capacity to fully stop the vehicle when the accelerator pedal is fully applied is based on the present temperature of vehicle brakes may be determined via indexing a function or table that holds curves similar to curves 502-504 based on present brake temperature. The table or function outputs the speed at which the vehicle brakes have capacity to fully stop the vehicle when the accelerator pedal is fully applied.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
reducing powertrain torque in response to a speed of the vehicle being greater than a speed at which vehicle brakes have capacity to fully stop the vehicle when an accelerator pedal is applied more than a threshold amount at a present temperature of vehicle brakes,
where the powertrain torque is reduced via at least partially closing a throttle.

2. The method of claim 1, further comprising increasing a force applied to vehicle brakes in response to the speed of the vehicle being greater than the speed at which the vehicle brakes have capacity to stop the vehicle at the present temperature of the vehicle brakes, where the speed at which vehicle brakes have capacity to fully stop the vehicle is based on the present temperature of vehicle brakes.

3. The method of claim 1, further comprising adjusting the speed at which the vehicle brakes have capacity to fully stop the vehicle when the accelerator pedal is applied more than the threshold amount at the present temperature of the vehicle brakes in response to road grade.

4. The method of claim 3, where the speed at which the vehicle brakes have capacity to stop the vehicle when the accelerator pedal is applied more than the threshold amount at the present temperature of the vehicle brakes increases in response to an increasing positive road grade.

5. The method of claim 3, where the speed at which the vehicle brakes have capacity to stop the vehicle when the accelerator pedal is applied more than the threshold amount at the present temperature of the vehicle brakes decreases in response to an increasing negative road grade.

6. The method of claim 1, further comprising shifting a transmission of the vehicle into neutral in response to the speed of the vehicle being greater than the speed at which vehicle brakes have capacity to stop the vehicle when the accelerator pedal is applied more than the threshold amount at the present temperature of the vehicle brakes.

7. A method for operating a vehicle, comprising:
providing a requested powertrain torque in response to a speed of the vehicle being less than a speed at which vehicle brakes have capacity to fully stop the vehicle when an accelerator pedal is applied more than a threshold amount at a present temperature of vehicle brakes; and
reducing powertrain torque in response to the speed of the vehicle being greater than the speed at which vehicle brakes have capacity to fully stop the vehicle when the accelerator pedal is applied more than the threshold amount at the present temperature of vehicle brakes,
where the speed at which vehicle brakes have capacity to fully stop the vehicle when the accelerator pedal is applied more than the threshold amount at the present temperature of the vehicle brakes is described via a curve of a plot.

8. The method of claim 7, further comprising shifting a transmission of the vehicle into neutral in response to the speed of the vehicle being greater than the speed at which vehicle brakes have capacity to stop the vehicle when the accelerator pedal is applied at the present temperature of vehicle brakes.

9. The method of claim 7, further comprising adjusting thresholds for determining accelerator pedal degradation in response to operating the vehicle above the speed at which vehicle brakes have capacity to fully stop the vehicle when the accelerator pedal is applied more than the threshold amount at the present temperature of vehicle brakes.

10. The method of claim 7, further comprising adjusting the speed at which the vehicle brakes have capacity to fully stop the vehicle when the accelerator pedal is applied more than the threshold amount at the present temperature of the vehicle brakes in response to road grade.

11. The method of claim 7, where the requested powertrain torque is based on accelerator pedal position.

12. The method of claim 7, further comprising applying vehicle brakes until the vehicle is within a predetermined speed of fully stopped when a brake pedal is released in response to a degraded accelerator pedal.

13. A system for a vehicle, comprising:
a powertrain;
an accelerator pedal;
a brake pedal;
vehicle brakes;
a transmission; and
at least one controller including executable instructions stored in non-transitory memory for reducing powertrain torque and applying the vehicle brakes in response to an indication of the accelerator pedal being degraded.

14. The system of claim 13, further comprising additional instructions to shift the transmission into neutral from a forward gear in response to the indication of the accelerator pedal being degraded.

15. The system of claim 13, further comprising additional instructions to adjust a vehicle stopping speed curve in response to road grade.

16. The system of claim 13, further comprising additional instructions to open a torque converter clutch in response to the indication of the accelerator pedal being degraded.

17. The system of claim 13, further comprising additional instructions to provide a requested torque via the powertrain after the indication of accelerator pedal degradation in response to the brake pedal being released and the accelerator pedal not being indicated as being degraded.

18. The system of claim 13, further comprising additional instructions to reduce the powertrain torque via at least partially closing a throttle.

19. A method for operating a vehicle, comprising:
reducing powertrain torque in response to a speed of the vehicle being greater than a speed at which vehicle brakes have capacity to fully stop the vehicle when an accelerator pedal is applied more than a threshold amount at a present temperature of vehicle brakes; and
increasing a force applied to vehicle brakes in response to the speed of the vehicle being greater than the speed at which the vehicle brakes have capacity to stop the vehicle at the present temperature of the vehicle brakes, where the speed at which vehicle brakes have capacity to fully stop the vehicle is based on the present temperature of vehicle brakes.

* * * * *